(12) United States Patent
Hu et al.

(10) Patent No.: US 6,357,678 B1
(45) Date of Patent: Mar. 19, 2002

(54) PROCESS FOR PRODUCING ULTRA FINELY-DIVIDED ZEOLITE POWDER

(75) Inventors: Patrick C. Hu, Baton Rouge; Conrad J. Langlois, Jr., New Roads; Ronald L. Camp, Baton Rouge, all of LA (US)

(73) Assignee: Albermarle Corporation, Richmond, VA (US)

( * ) Notice: Subject to any disclaimer, the term of this patent is extended or adjusted under 35 U.S.C. 154(b) by 0 days.

(21) Appl. No.: 09/430,856

(22) Filed: Oct. 29, 1999

(51) Int. Cl.$^7$ .......................... B02C 17/00; B02C 17/02
(52) U.S. Cl. ....................................... 241/21; 241/24.11
(58) Field of Search .................. 241/21, 24.11; 423/716, 717

(56) References Cited

U.S. PATENT DOCUMENTS

| | | | |
|---|---|---|---|
| 4,248,737 A | 2/1981 | Kulprathipanja | 252/430 |
| 4,298,501 A | 11/1981 | Kulprathipanja | 252/430 |
| 4,336,234 A | * 6/1982 | Leutner et al. | 423/329 |
| 4,339,244 A | * 7/1982 | Just et al. | 23/293 |
| 4,420,582 A | 12/1983 | Canard et al. | 524/450 |
| 4,431,456 A | 2/1984 | Kulprathipanja | 127/46.3 |
| 4,732,880 A | 3/1988 | Ugo et al. | 502/62 |
| 5,133,899 A | 7/1992 | Nakazawa et al. | 252/400.3 |
| 5,250,483 A | * 10/1993 | Sperl et al. | 502/7 |
| 5,556,699 A | 9/1996 | Niira et al. | 428/323 |
| 5,704,556 A | 1/1998 | McLaughlin | 241/21 |
| 5,739,188 A | 4/1998 | Desai | 524/140 |
| 5,979,805 A | * 11/1999 | Angeletakis | 241/21 |
| 6,096,820 A | 8/2000 | Lockledge et al. | 524/450 |

FOREIGN PATENT DOCUMENTS

| | | |
|---|---|---|
| DE | 298208 | 2/1992 |
| EP | 0354473 | 2/1990 |
| EP | 0 357 989 | 3/1990 |
| EP | 0 569 626 | 11/1993 |
| FR | 2488587 | 2/1982 |
| GB | 1153967 | 6/1969 |
| JP | 01153514 | 6/1989 |
| JP | 05070315 | 3/1993 |
| WO | 9634828 | 11/1996 |
| WO | 9825974 | 6/1998 |
| WO | 0015553 | 3/2000 |
| WO | 0015709 | 3/2000 |

OTHER PUBLICATIONS

Abstract of JP 56 036555, 1981, Derwent Publications XP–002161173.
Abstract of JP 03 195755, 1991, Derwent Publications XP–002161174.
Abstract of JP 05 184647, 1993, Derwent Publications XP–002161175.
Abstract of SU 1 432 082, 1988, Derwent Publications XP–002161176.
Patent Abstract of Japan of JP 02 163 184, 1990.

* cited by examiner

*Primary Examiner*—Allen Ostrager
*Assistant Examiner*—William Hong
(74) *Attorney, Agent, or Firm*—Philip M. Pippenger

(57) ABSTRACT

Particulate synthetic zeolite is micronized in a liquid organic medium to form a micronized zeolite product having an average (mean) particle size of about 2 microns or less and containing at least 90% by weight, based on the dry weight of the zeolite product, if isolated, of particles no larger than about 5 microns. Preferably, the micronized zeolite product has a mean particle size of 1 micron or less, and at least 90% by weight of the zeolite product, based on the dry weight of the zeolite product, if isolated, has a particle size of 2 microns or less. The liquid organic medium used is (a) inert or substantially inert, (b) devoid or substantially devoid of water, and (c) devoid of a dispersant.

29 Claims, No Drawings

PROCESS FOR PRODUCING ULTRA FINELY-DIVIDED ZEOLITE POWDER

BACKGROUND

A need has arisen for a process capable of producing ultra finely-divided synthetic zeolite powder for use in the production of detergent powder compositions and as a thermal stabilizer and/or blocking agent for certain polymer compositions.

Generally speaking, there are two approaches for producing synthetic zeolites of small particle size. One approach is to synthesize the zeolite in a very dilute aqueous medium. Unfortunately, attempts to recover the finely-divided zeolite product by removing the water from the aqueous medium have proven unsuccessful. Under the conditions used, the finely-divided zeolite particles agglomerated thereby producing a product of undesirably large, average particle size.

The other method involves physical subdivision of pre-formed particulate zeolite by use of milling procedures. Because of the relative low density of zeolites, the only known feasible method for effecting such subdivision has been ball milling of the zeolite in water containing a substantial amount of a dispersant. See in this connection McLaughlin, U.S. Pat. No. 5,704,556. Unfortunately, it was not possible to recover the finely-divided zeolite from the aqueous medium of the McLaughlin patent without experiencing substantial agglomeration of the particles. In fact, attempts to effect such separation have resulted in formation of zeolite particles having an average particle size larger than the zeolite as it existed prior to ball milling. In addition, the presence of the dispersant almost always leaves undesirable residues in the recovered product rendering it unsuitable, without further purification, for certain end use applications.

Japan kokai 01–153514, laid open on Jun. 15, 1989, describes formation of "submicron" A-type zeolite by a forming an aqueous solution from aluminum hydroxide and sodium hydroxide at 35° C. or less. A second aqueous solution of colloidal silica is formed, again at 35° C. or less. These solutions are mixed at 35° or less with agitation for a period of time (e.g., 5 hours) for nuclei to form, and the resultant slurry is then agitated for 24 hours at 35–38° C. for crystal growth to occur. It is indicated that the maximum particle size of the zeolite formed in this manner is 0.4 micron or less. However, the particle size of zeolite as reported by the kokai was determined by SEM (Scanning Electron Microscope, see Table 1, thereof) which is useful in determining the particle size of zeolite crystals, but not useful in determining the size of particles. The difference is that each particle consists of several zeolite crystals (or zeolite crystal particles). The particle size defined hereinafter is the size of particles determined under a dispersed state.

In sum, when using an electron microscope, one can distinguish the boundary of crystals, hence the crystal size. But one cannot distinguish particle boundary which is necessary for zeolite particle size determination.

Furthermore, to conduct a process such as described in the kokai, it is not possible to use as the starting material synthetic zeolite produced in existing plant facilities. Thus one or more conventional zeolite products plus the zeolite product of the kokai cannot be produced in an existing plant using conventional zeolite synthesis technology. Instead, to use the process of the kokai either new synthesis facilities are required, or the normal operation of the existing synthesis facilities, if adaptable for use in conducting the special process of the kokai, must be interrupted so as carry out such special process.

BRIEF SUMMARY OF THE INVENTION

This invention is deemed to provide an effective and efficient way of circumventing all of the foregoing difficulties whereby isolatable ultra fine synthetic zeolite powder can be effectively produced from synthetic zeolite that has been produced using conventional synthesis technology. New synthesis plant facilities are unnecessary. And the operation of existing synthesis plant facilities need not be interrupted in order to form finely-divided zeolite powder. Instead, the synthesis process can be carried out at the same time special finely-divided synthetic zeolite is being formed from conventional synthetic zeolite already produced. Moreover, the equipment required for conducting the process technology of this invention is readily available for purchase, if not already available at plant site. Moreover, finely-divided zeolite powder with true ultra-fine particle size are produced. Particle size is not determined by SEM, and thus erroneous particle size determinations are not obtained or utilized.

In accordance with one of its embodiments, this invention provides a process for producing ultra-finely divided synthetic zeolite which comprises micronizing particulate synthetic zeolite in an inert or substantially inert liquid organic medium that is devoid or substantially devoid of water, and devoid of dispersant, to form a micronized zeolite product having an average particle size of about 2 microns or less and containing at least 90% by weight, based on the total weight of the zeolite product (i.e., the weight of the zeolite solids if removed from the organic medium and dried), of particles no larger than about 5 microns. In other words, the weight percentage of the micronized zeolite product that fulfills this requirement of having an average particle size of about 2 microns or less is based on the dry weight of the zeolite product, as if it were in isolated form.

Another embodiment of this invention is a dry, finely-divided synthetic zeolite powder having an average (mean) particle size of about 2 microns or less, and containing at least 90% by weight, based on the dry weight of the zeolite product, if isolated, of particles no larger than about 5 microns. In a preferred embodiment, the mean particle size of the dry, finely-divided synthetic zeolite powder is 1 micron or less, and at least 90% by weight of the finely-divided zeolite powder (assuming the powder has been isolated and dried) has a particle size of 2 microns or less. The preferred zeolite in these compositions is zeolite-A, zeolite-X, or zeolite-Y, or a mixture of any two or all three of these. More preferred zeolites are zeolite-A and zeolite-X. Zeolite-A is the most preferred zeolite of this embodiment of the invention.

Still another embodiment is a composition comprising a mixture of (A) finely-divided anhydrous or substantially anhydrous synthetic zeolite having an average (mean) particle size of about 2 microns or less, and containing at least 90% by weight, based on the dry weight of the zeolite product, if isolated, of particles no larger than about 5 microns, and (B) a liquid organic medium. The organic medium constitutes a continuous liquid phase in the mixture. In preferred compositions of this type, the mean particle size of the finely-divided anhydrous or substantially anhydrous synthetic zeolite is 1 micron or less, and at least 90% by weight of such zeolite has a particle size of 2 microns or less. The preferred synthetic zeolite in these compositions is zeolite-A, zeolite-X, or zeolite-Y, or a mixture of any two or all three of these. More preferred zeolites are zeolite-A and zeolite-X. Zeolite-A is the most preferred zeolite for use in the practice of this embodiment of the invention. The synthetic zeolite used in forming these compositions must either be totally anhydrous or, if it contains water, its water content must be below the amount corresponding to the theoretical quantity of water of hydration for that particular zeolite. Preferably the zeolite will contain a total amount of water that is no more than 90 wt% of the theoretical quantity of water of hydration, and most preferably will contain no more than 20 wt% of this theoretical quantity. The water content of the zeolite being used in forming the foregoing compositions should be determined, in any case where the actual water content is not already known, by measuring the weight loss of a sample of such zeolite after the sample has been maintained at 800° C. for 1 hour.

To reduce the total quantity of water present in the zeolite to be used in forming the compositions described in the immediately preceding paragraph, it is preferable to preheat the particulate zeolite to a temperature in the range of about 40 to about 200° C., with or without application of reduced pressure.

Further embodiments are the compositions as described in the penultimate paragraph above wherein (B) is a liquid organic medium having a viscosity at 20° C. of at least 0.1 poise. The relatively viscous liquid organic medium in these compositions is preferably a liquid medium that has plasticizing properties for polymers, such as, for example, a synthetic ester. The preferred zeolite in these compositions is zeolite-A, zeolite-X, or zeolite-Y, or a mixture of any two or all three of these. More preferred zeolites are zeolite-A and zeolite-X. Zeolite-A is the most preferred zeolite for use in the practice of this embodiment.

In each of the above embodiments of this invention the synthetic zeolite used can be a partially or totally ion-exchanged zeolite. The cations of these exchanged zeolites can be zinc, calcium, magnesium, or other similar metallic cations. The preferred ion-exchanged zeolites are zeolite-A, zeolite-X, and zeolite-Y having a content of exchanged zinc or calcium cations. Non-ion-exchanged synthetic zeolites, however, are more preferred than ion- exchanged zeolites.

Other embodiments, features, and advantages of this invention will become still further apparent from the ensuing description and the appended claims.

FURTHER DETAILED DESCRIPTION

Unlike the McLaughlin patent cited above, the process of this invention is conducted in the absence of a dispersant. Even though a dispersant is absent, the ultra for zeolite particles do not coalesce or agglomerate to any appreciable extent during or after separation of the zeolite particles from the liquid organic medium. Thus the particles in the slurry in the organic medium are different in character from the particles formed by grinding a zeolite in water and a dispersant. Moreover, since no dispersant is used in the process of this invention, the cost and contamination problems associated with use of a dispersant are eliminated. It is also important to observe that while the McLaughlin patent mentions that the liquid vehicle used in that process can be water or an organic solvent, there is no suggestion or indication in the patent that anything beneficial could or might result from using an organic liquid instead of water. Instead, the patent indicates that as long as the liquid has a reasonably low viscosity and does not adversely affect the chemical or physical characteristics of the particles, the choice of the fluid vehicle is optional. In fact, water is indicated to be the preferred liquid, and the Examples of the patent all employ water as the liquid medium. Since the process of that patent is incapable of preparing a zeolite product which, if separated from the water, would have the particle size attributes of the zeolites that can be produced pursuant to this invention, the process of this invention is deemed to represent an unprecedented advance in the art. In short, the ultra fine particles of this invention possess an unexpected beneficial property which could not have been foreseen, namely, the capability of being separated from the liquid medium in which the ultra fine particles have been formed without undergoing any appreciable coalescence or agglomeration.

It will be understood that in the practice of this invention it is not necessary to separate the ultra fine particles from the organic liquid medium in which such particles have been formed by the ball milling step. The ultra fine particles while dispersed or suspended in a liquid organic medium always possess the unique capability of being separated from the liquid medium without undergoing appreciable coalescence or agglomeration. It will also be appreciated that solvent exchange procedures can be utilized wherein the ultra fine particles which are initially produced in a first liquid organic medium are in effect transferred to another liquid organic medium.

As noted above, a variety of synthetic zeolites can be subjected to the practice of this invention. Processes for the manufacture of such materials are well known and reported in the literature. Many zeolites, including the preferred zeolites such as zeolite-A, zeolite-X, and zeolite-Y, are available in the marketplace as articles of commerce. The particle size of the initial zeolite used in the process of this invention is not critical as long as the particles are susceptible to ball milling in the particular ball milling equipment being utilized. In any case where the initial zeolite particles are too large to be suitably milled in a ball mill, such particles can be reduced into a suitable size for ball milling by use of other grinding equipment such as a hammer mill, mortar and pestle, or the like.

Various types of liquid organic media can be used in the ball milling operation pursuant to this invention. Among suitable materials are alcohols, esters, and ethers, (including mixtures thereof) which are in the liquid state of aggregation at the grinding temperature being utilized, and preferably also at a temperature at least as low as 20° C. Examples of suitable alcohols, including polyols, are methanol, ethanol, ethylene glycol, 1-propanol, 2-propanol, 2-methyl-1-propanol, propylene glycol, 1-butanol, 3-pentanol, cyclopentanol, 2-hexanol, 2-heptanol, 1-octanol, and analogous alcohols or polyols. Suitable esters include methyl acetate, ethyl acetate, methyl propionate, ethyl propionate and analogous liquid esters. Ethers suitable for use include diethyl ether, ethyl n-propyl ether, diisopropyl ether, tetrahydrofuran, methyltetrahydrofuran, 1,4-dioxane, 1,3-dioxolane, cyclohexylmethyl ether, glyme (the dimethyl ether of ethylene glycol), diglyme (the dimethyl ether of diethylene glycol), triglyme, and tetraglyme. Hydrocarbons can be used as the liquid organic media but are less preferred because of the tendency of at least certain zeolites to undergo some clumping when dispersed in a liquid hydrocarbon medium.

In a highly preferred embodiment of this invention the liquid organic medium used in the ball milling operation is a liquid of lubricating viscosity having plasticizing properties. Examples of such liquids are poly-alpha-olefins, such as hydrogenated oligomers of 1-decene; alkyl esters of dicarboxylic acids; complex esters of dicarboxylic acid, polyglycol and alcohol; alkyl esters of carbonic or phosphoric acids; polysilicones; fluorohydrocarbon oils; and similar materials often sold either as plasticizers or as synthetic lubricating oils for use in gasoline engines. A few such synthetic esters include dibutyl adipate, di(2-ethylhexyl) adipate, didocyl adipate, di(tridecyl) adipate, di(2-ethylhexyl) sebacate, dilauryl sebacate, dihexylfurmate, dioctyl sebacate, diisooctyl azelate, diisodecyl azelate, dioctyl phthalate, didecyl phthalate, and analogous synthetic esters. These compositions are of particular utility as plasticizers for use in synthetic polymers.

The initial liquid organic medium used should be anhydrous or substantially anhydrous. Those skilled in the art of chemistry will readily understand that the term "substantially anhydrous" means that the amount of water present should not be enough to materially interfere with the efficacy of the operation which is being conducted in that medium. In the real world, it is practically impossible to exclude a few molecules of water from entering into what purports to be an anhydrous solvent. Anyone unfamiliar with the art of chemistry should consult a person skilled in the art, e.g., a manufacturer of the given solvent, to determine what they would regard as being anhydrous or substantially anhydrous. Organic solvent manufacturers operate with various sets of specifications on water contents for most organic solvents. As an alternative, one can simply conduct a test experiment using the proposed liquid organic medium to determine whether it is suitable or not in the operation. If it is not suitable because of its initial water content, the solvent is not "substantially anhydrous".

The particular design of the ball mill utilized in the practice of this invention is not critical. Thus, any of a wide variety of commercially available ball mills can be utilized. The balls or spheres utilized in the device will often be within a size range recommended by the particular manufacturer of the ball mill. Typically, the balls or spheres will be in the range of about 0.012 to about 0.5 inches (0.03 to about 1.27 centimeters) in diameter. The balls or spheres can be formed from any material of sufficient hardness and wear resistance, such as ceramics, metals, plastics, composites, or like materials of suitable physical properties and inertness.

In the ball milling operation, the initial slurry of the zeolite in the liquid organic medium will typically contain in the range of about 5 to about 40 wt % of the zeolite based on the total weight of the slurry. Slurries containing in the range of about 15 to about 30 wt % of the zeolite based on the total weight of the slurry are preferred.

Ordinarily, the ball milling operation will be conducted at ambient room temperature conditions. However, the operation can be conducted at temperatures either below or above room temperature. If desired, the temperature can be changed during the course of the ball milling. For example, during the ball milling the temperature can be changed from room temperature to an elevated temperature below the boiling temperature of the liquid organic medium in use. Conversely, the ball milling can initially be conducted at an elevated temperature below the boiling temperature of the liquid organic medium and can be progressively reduced in temperature as the ball milling progresses. In short, any suitable temperature conditions can be employed.

The ball milling operation is conducted for a period of time sufficient to produce a particle size distribution in the zeolite product meeting the requirements of this invention. Ordinarily, the time period for ball milling will be at least about 5 minutes and in some cases can extend to as much as 72 hours or longer. In practice, the length of time to be used in any given set of circumstances should be determined by performing a few pilot experiments to optimize the grinding conditions, including time, in any situation where the optimum conditions are not already known.

It has been pointed out above that upon completion of the ball milling step, the ultra fine zeolite can be maintained in the liquid organic medium for subsequent use or the ultra fine zeolite can be isolated in powder form by separating the ultra fine zeolite product and the liquid organic medium from each other. It is also possible to conduct a solvent exchange operation on the slurry of the ultra fine zeolite produced in the ball milling operation. In this case, the liquid organic medium in which the ball milling was conducted is replaced by another suitable liquid organic medium to thereby form a slurry of the ultra fine zeolite in the new diluent.

If it is desired to isolate the ultra fine zeolite from a liquid organic medium, various physical separation procedures are available for use. For example, the slurry can be subjected to filtration, centrifugation, decantation, or like procedure. The isolated finely-divided zeolite is then dried such as in a circulating air oven, a vacuum dryer, a spray dryer, a drum dryer, a tray dryer, or similar drying apparatus. In some cases, it is desirable to physically agitate the dried ultra fine zeolite in order to produce a free flowing ultra fine powder.

The following Examples illustrate the practice and advantages of this invention. These Examples are not intended to limit and should not be construed to limit this invention inasmuch as they are presented for purposes of illustration and not limitation.

Comparative Example 1, which forms no part of this invention, presents the results of a group of experiments demonstrating the impossibility of isolating ultra fine zeolite particles prepared in an aqueous medium.

COMPARATIVE EXAMPLE 1

Particulate zeolite-A (Albemarle Corporation) containing approximately 20 wt % of water of hydration was used to prepare a 30 wt % slurry in water. This slurry was charged into a 0.5 liter ball mill together with one-fourth inch diameter alumina balls (produced by Coors Ceramics Company). Typically the quantity of balls used was such as to extend for about three-fourths of the height of the cylinder-shaped ball mill when the cylinder was in a vertical position. In other words, the "apparent" volume of the balls in the cylinder (i.e., ignoring the volume of the space within the zone occupied by the balls) was approximately 75% of the total volume of the cylinder. Into the mill was then charged the 30 wt % zeolite slurry in an amount just sufficient to immerse all of the balls within the liquid phase of the slurry. After grinding for 72 hours, the milled slurry was then removed from the mill and subjected to the following steps:

1) The slurry was centrifuged to separate the zeolite from the water, and the water was discarded.
2) The zeolite solids were re-slurried in a 1 wt % aqueous sodium hydroxide solution.
3) The resultant slurry was centrifuged to separate the zeolite solids from the aqueous caustic solution, which solution was discarded.
4) Water-wet and dry portions of the processed zeolite were subjected to particle size analysis. In particular, a portion of the zeolite solids from step 3) was subjected, while wet with water, for particle size analysis using a MICROTRAC® FRA Model No. 9240-4-10-1 particle size analyzer manufactured by Leeds & Northrup. Another portion of the zeolite solids from step 3) was dried in an oven at 115° C. for 2 hours and subjected to particle size analysis in the same particle size analyzer.

Step 4) as initially conducted provided particle size determinations on a first pair of zeolite samples, one being a dry sample and the other being a water-wet sample.

The remainder of the zeolite solids collected in step 3) above was subjected to steps 2) and 3) for a second time, and then water-wet and dry portions of this processed zeolite were subjected to particle size analysis as in step 4). This provided a second set of particle size determinations, one on a dry sample and one on a water-wet sample. The procedure of this paragraph was repeated for a third time using the residual zeolite solids remaining from step 3) when conducted for the second time. This provided particle size determinations on a third pair of zeolite samples, one being a dry sample and the other being a water-wet sample. Finally, the foregoing procedure was repeated for a fourth time using the residual zeolite solids remaining from step 3) when conducted for the third time. This provided particle size determinations of a fourth pair of zeolite samples, one being a dry sample and the other being a water-wet sample.

For control purposes, a sample of the zeolite-A from the initial slurry prior to milling was also subjected to particle size analysis using the same particle size analyzer.

The results of these determinations are summarized in Table 1.

TABLE 1

| Sample Identification | Mean particle size | 90% of the particles were less than this size |
| --- | --- | --- |
| Control (no milling) | 3.38 microns | 6.25 microns |
| Sample 1, wet | 0.73 micron | 1.15 microns |
| Sample 1, dry | 5.85 microns | 13.1 microns |
| Sample 2, wet | 0.8 micron | 1.32 microns |
| Sample 2, dry | 22.5 microns | 53.2 microns |
| Sample 3, wet | 0.76 micron | 1.21 microns |
| Sample 3, dry | 97.1 microns | 315 microns |
| Sample 4, wet | 0.63 micron | 0.95 micron |
| Sample 4, dry | 20 microns | 47.1 microns |

Example 2 illustrates the practice of this invention wherein the organic liquid medium used in the ball milling operation was 1-propanol.

EXAMPLE 2

The procedure used in this Example involved milling a sample of dehydrated zeolite-A in 1-propanol. Dehydration was effected by maintaining the zeolite at 150° C. for 4 hours. Three pairs of samples were prepared. The first pair of samples prepared pursuant to this invention was formed by grinding 40 grams of the dehydrated zeolite with 60 grams of 1-propanol in the 0.5 liter mill for 64 hours. One sample was subjected, while wet with 1-propanol, to particle size analysis using the particle size analyzer referred to in Comparative Example 1. Another sample was subjected to this particle size analysis after drying in a vacuum oven at 115° C. for 2 hours. The second pair of samples was formed in the same manner except that 480 grams of the dried zeolite was ground in a 6 liter mill together with 720 grams of 1-propanol for 64 hours. The third pair of samples involved subjecting a portion of the slurry remaining from the second pair of samples to grinding in a 2 liter mill for another 42 hours. In each case, one-fourth inch diameter alumina balls from Coors Ceramics Company were used and the mill was charged in the same manner as in Comparative Example 1 except that the slurry was made from 1-propanol rather than water.

The results of these particle size determinations are summarized in Table 2.

TABLE 2

| Sample Identification | Mean particle size | 90% of the particles were less than this size |
| --- | --- | --- |
| Sample 1, wet | 0.68 micron | 1.03 microns |
| Sample 1, dry | 0.66 micron | 1.02 microns |
| Sample 2, wet | 0.96 micron | 1.49 microns |
| Sample 2, dry | 0.96 micron | 1.49 microns |
| Sample 3, wet | 0.77 micron | 1.2 microns |
| Sample 3, dry | 0.77 micron | 1.2 microns |

It can be seen from the results in Table 2 that in sharp contrast to the results in Table 1, the finely-divided zeolite produced pursuant to this invention in an organic medium (1-propanol) could be isolated from the organic liquid medium without undergoing any appreciable agglomeration. In short, the finely-divided zeolite of this invention could be isolated without losing its ultra fine particle size.

Examples 3–7 further illustrate the practice and advantages of this invention. Various liquid organic media were used in these Examples. Also, ball mills of different sizes were used. In Example 3, the synthetic zeolite used was Zeolite-A which had been partially ion exchanged with zinc prior to the ball milling step.

EXAMPLE 3

The zinc-containing zeolite was prepared by adding 40 grams of zinc sulfate heptahydrate to 600 grams of zeolite-A slurried in 1800 grams of water at room temperature for 4 hours under agitation. After the zinc ion exchange, the slurry was filtered and the filter cake was washed with deionized water on a 5-inch rotary centrifuge. The filter cake was collected and oven dried at 150° C. for 8 hours under vacuum to form the partially ion-exchanged zinc zeolite. 1-Propanol was used as the liquid organic grinding medium. Into a 5-liter ball mill jar, partially filled with one-fourth inch alumina balls, from Coors Ceramics Company, as in Comparative Example 1, was charged a 30 wt % slurry of the partially ion-exchanged zinc zeolite in 1-propanol, the amount of the slurry being such that the balls were totally immersed in the liquid phase of the slurry. After grinding the slurry in the ball mill jar for 94 hours, the slurry was filtered and the residual solvent on the filter cake was removed in a vacuum oven at 150° C. for 24 hours. After drying, the filter cake was pulverized in a Waring blender. A particle size determination was then performed as in Comparative Example 1 on a sample of the resultant zinc zeolite powder of this invention.

EXAMPLE 4

A zeolite-A sample was prepared by grinding a commercially available zeolite-A (Albemarle Corporation). The starting zeolite powder was first dried in a convection oven at 60° C. for 72 hours. 1-Propanol was added to the zeolite to form a slurry with a solid content of approximately 30 wt %. The zeolite slurry was then poured into a 5-liter ball mill equipped with one-fourth inch alumina balls, from Coors Ceramics Company, as in Comparative Example 1, and ground for 92 hours. After the grinding, the slurry was filtered and the residual solvent on the filter cake was removed by placing the propanol-wet zeolite filter cake in a vacuum oven at 60° C. for 24 hours. A particle size determination was then performed as in Comparative Example 1 on a sample of the finely-divided zeolite-A of this invention so produced and isolated.

EXAMPLE 5

In this operation, 1-hexanol was used at the liquid organic medium for the ball milling operation. In particular, 40 grams of another portion of the dried starting zeolite powder of Example 4 was blended with 200 grams of 1-hexanol to form a slurry. The slurry was ground for 92 hours in a 1-liter ball mill using one-fourth inch alumina balls in the manner of Comparative Example 1. After milling, the zeolite was filtered and the zeolite filter cake was dried in a vacuum oven at 100° C. for 24 hours. A sample of the finely-divided zeolite-A of this invention so produced and isolated, was subjected to a particle size determination as in Comparative Example 1.

vacuum. In a second operation (Case 2), the same procedure as in Case 1 was followed except that the grinding time was 64 hours. A sample of each of the two finely-divided zeolite-A products of this invention so produced and isolated, was subjected to a particle size determination as in Comparative Example 1.

Table 3 summarizes the results of the particle size determinations on the finely-divided zeolite products produced and isolated in Examples 3–7. All sizes given in Table 3 are in microns.

TABLE 3

| Sample Identification | Mean particle size | 90% of the particles were less than this size | 75% of the particles were less than this size | 50% of the particles were less than this size | 25% of the particles were less than this size | 10% of the particles were less than this size | % of the particles that were larger than 2 microns |
|---|---|---|---|---|---|---|---|
| Starting zeolite-A before drying | 3.826 | 6.87 | 4.83 | 3.16 | 1.84 | 0.93 | >70% |
| Zn-exchanged zeolite of Ex. 3 | 0.77 | 1.20 | — | 0.72 | — | 0.42 | 1.1% |
| Zeolite milled in 1-propanol per Ex. 4 | 0.719 | 1.389 | 0.991 | 0.605 | 0.374 | 0.238 | 0.7% |
| Zeolite milled in 1-hexanol per Ex. 5 | 0.549 | 1.078 | 0.692 | 0.457 | 0.298 | 0.154 | 0.3% |
| Zeolite milled in ethanol per Ex. 6 | 0.903 | 1.763 | 1.282 | 0.786 | 0.457 | 0.236 | 4 |
| Zeolite milled in heptane per Ex. 7, Case 1 | 2.23 | 3.67 | — | 2.05 | — | 0.99 | — |
| Zeolite milled in heptane per Ex. 7, Case 2 | 1.69 | 3.0 | — | 1.19 | — | 0.57 | — |

EXAMPLE 6

The liquid organic medium used in this operation was ethanol. In this operation, 4540 grams of the another portion of the dried starting zeolite powder of Example 4 and 6265 grams of anhydrous ethanol were blended to form a slurry. The slurry was poured into the jar of a 25-liter ball mill filled to an apparent volume of 75–80% (i.e., the balls extended to 75–80% of the height of the jar in a vertical position) with one-fourth inch diameter alumina balls from Coors Ceramics Company. The zeolite in the slurry was ground for 92 hours. After milling, the zeolite slurry was filtered and the zeolite filter cake was dried in a vacuum oven at 100° C. for 24 hours. A sample of the finely-divided zeolite-A of this invention so produced and isolated, was subjected to a particle size determination as in Comparative Example 1.

EXAMPLE 7

In these operations, another portion of the dried starting zeolite of Example 4 was added to n-heptane to form a slurry of 40 wt % solids. It was noted that the zeolite did not disperse as well in the n-heptane medium an in alcoholic media. Some of the zeolite powder tended to form clumps. In one operation (Case 1), the slurry was ground in a 0.5-liter ball mill for 8 hours using one-fourth inch alumina spheres from Coors Ceramics Company. After grinding, the bulk of the n-heptane was removed by means of filtration, and the filter cake was then oven-dried at 150° C. for 4 hours under In connection with this invention, particle size determination must not be based on use of scanning electron microscopy. Instead a MICROTRAC® FRA Model No. 9240-4-10-1 particle size analyzer manufactured by Leeds & Northrup, or other particle size analyzer of at least equivalent accuracy and precision is to be used.

Compounds referred to by chemical name or formula anywhere in this document, whether referred to in the singular or plural, are identified as they exist prior to coming into contact with another substance referred to by chemical name or chemical type (e.g., another component, a solvent, or etc.). It matters not what preliminary chemical changes, if any, take place in the resulting mixture or solution, as such changes are the natural result of bringing the specified substances together under the conditions called for pursuant to this disclosure. Also, even though the claims may refer to substances in the present tense (e.g., "comprises", "is", etc.), the reference is to the substance as it exists at the time just before it is first contacted, blended or mixed with one or more other substances in accordance with the present disclosure.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented That which is claimed is:

1. A process for producing ultra-finely divided synthetic zeolite which comprises milling particulate synthetic zeolite which is anhydrous or which contains a total amount of water that is no more than 90 wt % of the theoretical quantity of water of hydration of said synthetic zeolite, in a liquid organic medium, wherein said medium is (a) inert or substantially inert, (b) devoid or substantially devoid of water, and (c) devoid of a dispersant, to form a micronized zeolite product having an average particle size of about 2 microns or less and containing at least 90% by weight, based on the dry weight of the zeolite product, if isolated, of particles no larger than about 5 microns.

2. A process according to claim 1 further comprising separating the organic medium and said micronized zeolite product from each other.

3. A process according to claim 1 wherein the milling is effected in a ball mill.

4. A process according to claim 3 wherein ceramic balls are used in said ball mill.

5. A process according to claim 3 wherein the particulate zeolite is milled to form a micronized zeolite product having a mean particle size of 1 micron or less, and wherein at least 90% by weight of said product, based on the dry weight of the zeolite product, if isolated, has a particle size of 2 microns or less.

6. A process according to claim 1 wherein said organic medium is at least one substantially non-volatile liquid plasticizer, and wherein said micronized zeolite product is in the form of a slurry in said plasticizer.

7. A process according to claim 1 wherein said organic medium has a viscosity at 20° C. of about 0.05 poise or less, and a boiling point of 100° C. or less, and wherein said micronized zeolite product and said organic medium are separated from each other under substantially inert, anhydrous conditions such that the micronized zeolite product being separated does not undergo any appreciable agglomeration during the separation.

8. A process according to claim 7 wherein said separation comprises subjecting a slurry of said micronized zeolite product in said organic medium to filtration, centrifugation, or decantation under substantially inert, anhydrous conditions, and evaporating the residual organic medium from the resultant micronized zeolite product.

9. A process according to claim 8 wherein said organic medium is at least one alcohol.

10. A process according to claim 9 wherein said at least one alcohol is one or a mixture of alkanols having in the range of 1 to about 6 carbon atoms in the molecule.

11. A process according to claim 8 wherein after evaporating the residual organic medium from the resultant micronized product, the zeolite product is subjected to agitation to produce a free-flowing powder having an average particle size of about 2 microns or less and containing at least 90% by weight, based on the dry weight of the zeolite product, if isolated, of particles no larger than about 5 microns.

12. A process according to claim 5 wherein said organic medium has a viscosity at 20° C. of about 0.05 poise or less, and a boiling point of 100° C. or less, and wherein said micronized zeolite product and said organic medium are separated from each other under substantially inert, anhydrous conditions such that the micronized zeolite product being separated does not undergo any appreciable agglomeration during the separation.

13. A process according to claim 12 wherein said separation comprises subjecting a slurry of said micronized zeolite product in said organic medium to filtration, centrifugation, or decantation under substantially inert, anhydrous conditions, and evaporating the residual organic medium from the resultant micronized zeolite product.

14. A process according to claim 13 wherein said organic medium is at least one alcohol.

15. A process according to claim 14 wherein said at least one alcohol is one or a mixture of alkanols having in the range of 1 to about 6 carbon atoms in the molecule.

16. A process according to claim 13 wherein after evaporating the residual organic medium from the resultant micronized product, the zeolite product is subjected to agitation to produce a free-flowing powder wherein the mean particle size is 1 micron or less, and wherein at least 90% by weight of said product, based on the dry weight of the zeolite product, if isolated, has a particle size of 2 microns or less.

17. A process according to claim 1 wherein the particulate zeolite to be micronized is zeolite-A, zeolite-X, or zeolite-Y.

18. A process according to claim 1 wherein the particulate zeolite to be micronized is substantially free from water other than water of hydration, and wherein said total amount of water in said zeolite is no more than 20 wt % of the theoretical quantity of water of hydration of said synthetic zeolite.

19. A process according to claim 1 wherein the micronizing is performed at least at one temperature in the range of about 20° C. to about 100° C.

20. A process according to claim 19 wherein prior to the micronizing, the particulate zeolite to be micronized is heated in the absence of said organic medium to a temperature in the range of about 30° C. to about 100° C. to remove water from the zeolite, and wherein the micronizing is performed at a temperature no higher than the temperature at which said zeolite was heated in the absence of said organic medium to remove water therefrom.

21. A process according to claim 20 wherein the particulate zeolite is zeolite-A.

22. A process according to claims 1, 5, or 18 wherein said organic medium is an organic medium which is in the liquid state of aggregation at a temperature at least as low as 20° C. and which is a medium selected from the group consisting of alcohols, esters, ethers, and mixtures thereof.

23. A process according to claim 22 wherein the particulate zeolite to be milled is selected from the group consisting of zeolite-A, zeolite-X, or zeolite-Y.

24. A process according to claim 22 wherein the particulate zeolite to be milled is zeolite-A.

25. A process according to claims 1, 5, or 18 wherein said organic medium is at least one alcohol.

26. A process according to claim 25 wherein the particulate zeolite to be micronized is zeolite-A, zeolite-X, or zeolite-Y.

27. A process according to claim 25 wherein said at least one alcohol is one or a mixture of alkanols having in the range of 1 to about 6 carbon atoms in the molecule.

28. A process according to claims 1, 5, or 18 wherein said organic medium has a viscosity at 20° C. of about 0.05 poise or less, and a boiling point of 100° C. or less.

29. A process according to claim 28 wherein the particulate zeolite to be micronized is zeolite-A, zeolite-X, or zeolite-Y.

* * * * *